United States Patent

Sheller et al.

[11] Patent Number: 5,820,835
[45] Date of Patent: Oct. 13, 1998

[54] ASSEMBLY AND METHOD FOR MAKING CATALYTIC CONVERTER STRUCTURE

[75] Inventors: David Thomas Sheller, Garretsville; William A. Whittenberger, Leavittsburg, both of Ohio

[73] Assignee: Engelhard Corporation, Iselin, N.J.

[21] Appl. No.: 720,411

[22] Filed: Sep. 30, 1996

Related U.S. Application Data

[60] Division of Ser. No. 580,101, Dec. 22, 1995, abandoned, which is a continuation-in-part of Ser. No. 501,755, Jul. 12, 1995, abandoned.

[51] Int. Cl.⁶ ..................................................... B01D 53/34
[52] U.S. Cl. .......................... 422/180; 422/177; 422/211; 422/222; 428/116; 428/593; 502/439
[58] Field of Search .................................... 422/171, 177, 422/180, 211, 222; 60/299; 428/593, 594, 116; 502/439, 527

[56] References Cited

U.S. PATENT DOCUMENTS

| | | | |
|---|---|---|---|
| 3,890,104 | 6/1975 | Porta et al. | 422/197 |
| 5,070,694 | 12/1991 | Whittenberger | 422/180 |
| 5,342,588 | 8/1994 | Humpolik | 422/180 |
| 5,366,700 | 11/1994 | Humpolik et al. | 422/180 |
| 5,651,906 | 7/1997 | Whittenberger et al. | 422/174 |

*Primary Examiner*—Hien Tran

[57] ABSTRACT

A catalytic converter is constructed by assembling a plurality of non-nestable foil leaves, each having opposite proximal and distal ends defining a leaf length. The proximal ends of the foil leaves are interconnected to provide a continuous flexible strip of overlapping foil leaves in which the distal ends of the leaves extend freely. The strip of foil leaves is subsequently formed to arrange the leaves to lie in curved paths radiating inwardly from the interconnected proximal ends toward a central area.

1 Claim, 4 Drawing Sheets

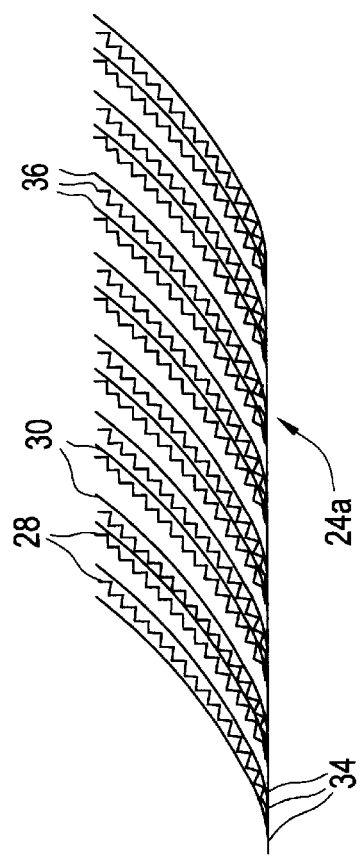
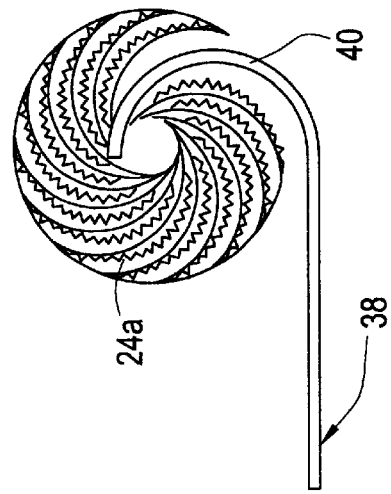
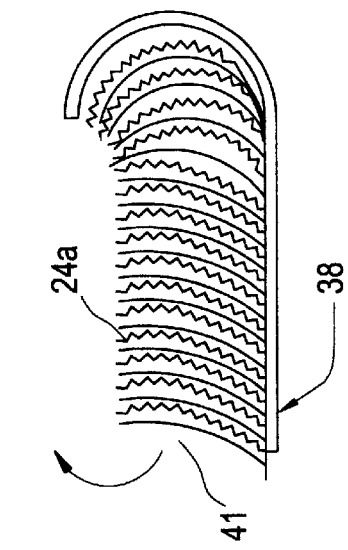
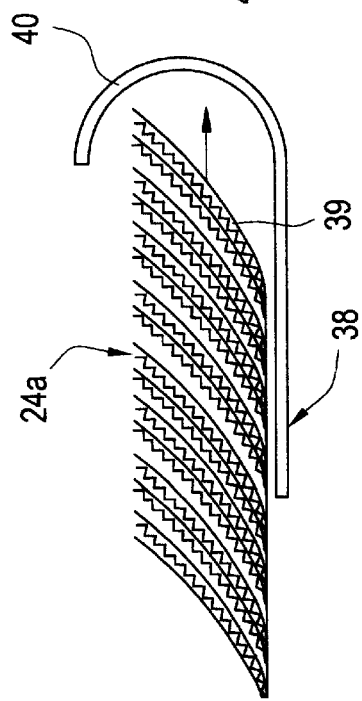

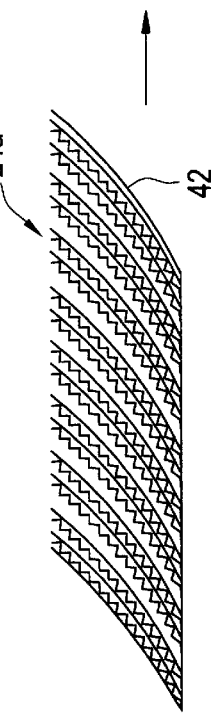
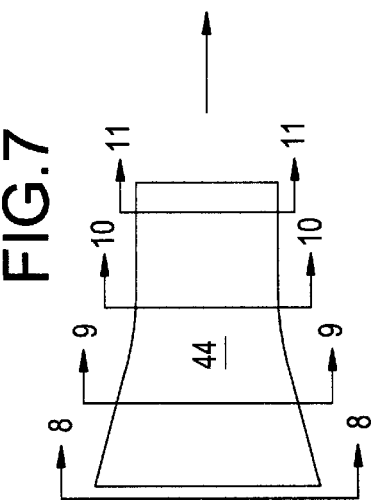
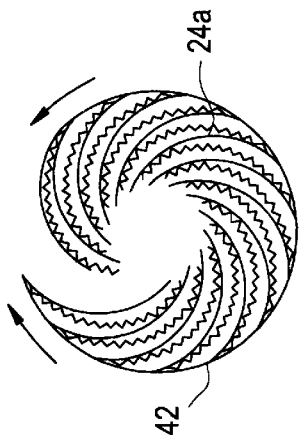
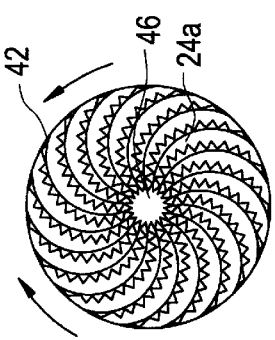
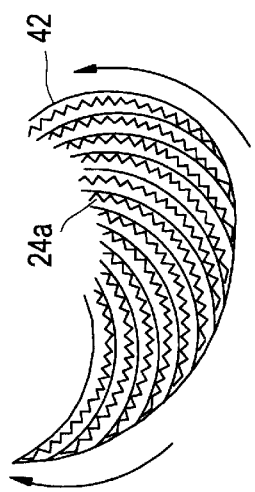
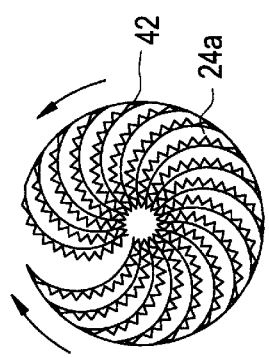

ASSEMBLY AND METHOD FOR MAKING CATALYTIC CONVERTER STRUCTURE

This is a division of application Ser. No. 08/580,101, filed Dec. 22, 1995, now abandoned, which is a continuation-in-part of application Ser. No. 08/501,755 filed Jul. 12, 1995, now abandoned.

CROSS REFERENCE TO RELATED APPLICATIONS

The present application is related to the applications, entitled Assembly and Method for Making Catalytic Converter Structures, as follows: Ser. No. 08/577,616 by William A. Whittenberger, John J. Chlebus, Joseph E. Kubsh, and Boris Y. Brodsky; Ser. No. 08/577,618 by William A. Whittenberger and Boris Y. Brodsky; Ser. No. 08/580,102 by David T. Sheller, Steven Edson and William A. Whittenberger; Ser. No. 08/577,615 by William A. Whittenberger, David T. Sheller, and Gordon W. Brunson; Ser. No. 08/577,619 by David T. Sheller, William A. Whittenberger and Joseph E. Kubsh; Ser. No. 08/577,617 by William A. Whittenberger, Gordon W. Brunson, and Boris Y. Brodsky; and Ser. No. 08/580,103 by William A. Whittenberger and Gordon W. Brunson; The complete disclosure of all of these applications are incorporated herein by reference.

BACKGROUND OF THE INVENTION

1. Field of the Invention

The present invention relates to methods for the manufacture of metallic catalytic converters, and, more particularly, to such converters especially adapted for use in vehicular engines to control exhaust emissions, and to foil subassemblies useful in the practice of such methods.

2. Description of the Related Art

Catalytic converters containing a corrugated thin metal (stainless steel) monolith typically have been formed of a plurality of thin metal strips or foil leaves wound about a central pin or about spaced "fixation" points. Such prior catalytic converters bodies, have supported both the outer and inner end of the individual layers by fixing them to the housing for the converter body and a central pin or post. In certain instances, the interior support has been provided by looping the foil leaves about a fixed point or portion whereby the inner ends of the leaves have been supported by other foil leaves. The thin metal strips or leaves forming the multicellular honeycomb body also have been brazed together at points intermediate the ends to form a rigid honeycomb monolith. Various techniques such as soldering, welding, brazing, riveting, clamping, reverse wrapping or folding, or the like, have been used to secure the inner and outer ends, and usually the intermediate portion, of the leaves or strips to the support member. While many techniques have been used to assemble the leaves into the housing and many leaf arrangements have been constructed, many arrangements have been unable to survive severe automotive industry tests known as the Hot Shake Test, the Hot Cycling Test, combinations of these tests, cold vibration testing, water quench testing, and impact testing.

The Hot Shake test involves oscillating (50 to 200 Hertz and 28 to 80 G inertial loading) the device in a vertical, radial or angular attitude at a high temperature (between 800 and 1050 degrees C.; 1472 to 1922 degrees F., respectively) with exhaust gas from a gas burner or a running internal combustion engine simultaneously passing through the device. If the device telescopes, or displays separation or folding over of the leading or upstream edges of the foil leaves, or shows other mechanical deformation or breakage up to a predetermined time, e.g., 5 to 200 hours, the device is said to fail the test.

The Hot Cycling Test is run with exhaust flowing at 800 to 1050 degrees C.; (1472 to 1922 degrees F.) and cycled to 120 to 200 degrees C. once every 13 to 20 minutes for up to 300 hours. Telescoping or separation of the leading edges of the thin metal foil strips, or mechanical deformation, cracking or breakage is considered a failure.

Also, the Hot Shake Test and the Hot Cycling Test are sometimes combined, that is, the two tests are conducted simultaneously or superimposed one on the other.

The Hot Shake Test and the Hot Cycling Test are hereinafter called "Hot Tests." While they have proved very difficult to survive, the structures of the present invention are designed to survive these Hot Tests and other tests similar in nature and effect that are known in the industry.

From the foregoing, it will be appreciated that catalytic converter bodies and their method of manufacture have received considerable attention, particularly by the automotive industry, are complex in design and manufacture, and are in need of improvement.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, a method of making a catalytic converter is provided, comprising the steps of assembling a plurality of nonnesting metal sheets or foil leaves, each having opposite proximal and distal ends defining a leaf length, by interconnecting the proximal ends of the foil leaves to provide a continuous flexible strip of overlapping foil leaves in which the distal ends of the leaves extend freely; and subsequently forming the strip of foil leaves, arranging the leaves to lie in curved paths radiating inwardly from the interconnected proximal ends toward a central area.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIGS. 2–5 are cross-sectional views of a method of forming a strip of foil leaves into a catalytic converter incorporating the teachings of the present invention.

FIGS. 6 and 7 respectively show a subassembly and a fixture for forming the subassembly into a catalytic converter.

FIGS. 8–11 are the configurations of the flexible strip at the locations in FIG. 7 bearing their figure number.

DESCRIPTION OF THE PREFERRED EMBODIMENTS

Figure 1A:
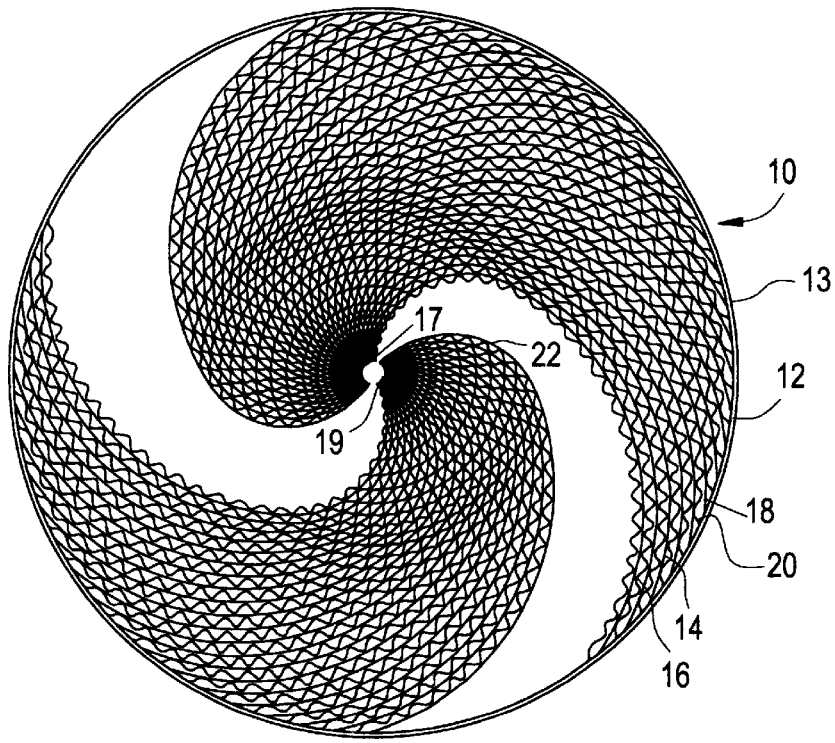
FIG. 1A is a partial cross-sectional view of a catalytic converter incorporating the teachings of the present invention.

Reference will now be made in detail to the present preferred embodiments of the invention, which is are illustrated in the accompanying drawings. Wherever possible, the same reference numbers will be used throughout the drawings to refer to the same or like parts.

One aspect of the present invention is based on a finding by the inventors that the structure of a metallic catalytic converter body can be improved by allowing the metal sheets referred to as foil leaf core elements or foil leaves to be compliant, move, flex, or float in the fluid stream. Whereas it was previously thought that rigidity was essential to prevent failure in the "Hot Tests," it has been discovered that flexure or compliance of the foil leaf core elements in response to thermal and fluid flow variations as well as mechanical vibration were desirable attributes in converter bodies used in various applications.

This discovery has given rise to what is termed a "cantilever" converter body, namely, one in which the foil leaf elements forming the core are secured at one end only or are secured at their second end in a manner, so the individual foil leaf core elements are "compliant", that is, they move or yield to stresses within the elastic limit of the thin metal.

Another aspect of the present invention relates to the method of assembling the foil leaves and involves initially constructing a subassembly having overlapping foil leaves cantilevered from one end and subsequently form that subassembly into a catalytic converter core, selectively securing the cantilevered ends as desired or maintaining all or a portion of the cantilevered ends in a partially or completely unsecured arrangement, as desired for the particular characteristics of the application for which the subassembly is intended.

The foil leaf arrangement may be constructed from "ferritic" stainless steel such as that described in U.S. Pat. No. 4,414,023 to Aggen. One usable ferritic stainless steel alloy contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV."

Another usable commercially available stainless steel metal alloy is identified as Haynes 214 alloy. This alloy and other useful nickeliferous alloys are described in U.S. Pat. No. 4,671,931 dated 9 Jun. 1987 to Herchenroeder et al. These alloys are characterized by high resistance to oxidation and high temperatures. A specific example contains 75% nickel, 16% chromium, 4.5% aluminum, 3% iron, optionally trace amounts of one or more rare earth metals except yttrium, 0.05% carbon, and steel making impurities. Haynes 230 alloy, also useful herein has a composition containing 22% chromium, 14% tungsten, 2% molybdenum, 0.10% carbon, a trace amount of lanthanum, balance nickel.

The ferritic stainless steels, and the Haynes alloys 214 and 230, all of which are considered to be stainless steels, are examples of high temperature resistive, oxidation resistant (or corrosion resistant) metal alloys that are useful for use in making the foil leaf core elements or leaves of the present invention, as well as the multicellular honeycomb converter bodies thereof. Suitable metal alloys must be able to withstand "high" temperature, e.g., from 900 degrees C. to 1200 degrees C. (1652 degrees F. to 2012 degrees F.) over prolonged periods.

Other high temperature resistive, oxidation resistant metal alloys-are known and may be used herein. For most applications, and particularly automotive applications, these alloys are used as "thin" metal or foil, that is, having a thickness of from about 0.001" to about 0.005", and preferably from 0.0015" to about 0.0037". The housings, or jacket tubes, hereof are of stainless steel and have a thickness of from about 0.03" to about 0.08", preferably, 0.04" to 0.06".

The multicellular converter bodies of the present invention preferably are formed from foil leaves precoated before assembly, such as described in U.S. Pat. No. 4,711,009 Cornelison et al. The converter bodies of the invention may be made solely of corrugated foil core elements which are non-nesting, or of alternating corrugated and flat foil core elements, or of other non-nesting arrangements, or of other arrangements providing cells, flow passages, or a honeycomb structure when assembled. In the preferred embodiments, the foil leaves, which will be used as core elements, are precoated before assembly. The ends are masked or cleansed to maintain them free of any coating so as to facilitate brazing or welding to the housing or to an intermediate sleeve.

As indicated in U.S. Pat. No. 4,911,007, supra, the coating is desirably a refractory metal oxide, e.g., alumina, alumina/ceria, titania, titania/alumina, silica, zirconia, etc., and if desired, a catalyst may be supported on the refractory metal oxide coating. For use in catalytic converters, the catalyst is normally a noble metal, e.g., platinum, palladium, rhodium, ruthenium, indium, or a mixture of two or more of such metals, e.g., platinum/rhodium. The refractory metal oxide coating is generally applied in an amount ranging from about 10 mgs/square inch to about 80 mgs/square inch.

In some applications, corrugations preferably have an amplitude of from about 0.02 inch to about 0.1 inch, and a pitch of from about 0.02 inch to about 0.25 inch. The amplitude and pitch of the corrugations determine cell density, that is, the number of cells per unit of cross-sectional area in the converter body. Typically, the cell density is expressed in cells per square inch (cpsi) and may vary from about 50 cpsi to 2000 cpsi.

Where a non-nesting corrugated foil leaf core element is used, the corrugations are generally patterned, e.g., a herringbone pattern or a chevron pattern, or skewed pattern. In a "skewed pattern", the corrugations are straight, but at an angle of from 3 degrees to about 10 degrees to the parallel marginal edges of the strips. The latter foil leaf core elements may be layered without nesting.

Where alternating corrugated and flat foil leaf core elements are used in a non-nesting arrangement to form the multicellular bodies, straight-through corrugations may be conveniently used, these exhibiting the lowest pressure drop at high flow in fluid flowing through the converter body. The straight-through corrugations are usually oriented along a line normal to the longitudinal marginal edges of the foil leaves, although, as indicated above, the corrugations may be oriented along a line oblique to the longitudinal marginal edges of the leaves.

To reduce stress, the "flat" foil leaf core elements preferably are lightly corrugated to have corrugations with an amplitude of from about 0.002" to about 0.01", e.g., 0.005" and a pitch of from about 0.02" to about 0.2", e.g., 0.1".

The coated corrugated and flat foil leaves that form the working gas flow passageways in the converter body of the invention constitute the major metal foil content thereof and are preferably formed of the lower cost ferritis stainless steel alloys. Because of its greater strength, albeit higher cost, the nickeliferous stainless steel alloys may be used in the converter of the invention particularly in the center area and other areas where the requirement for foil strength justifies the higher cost of these alloys. In the ensuing description and in the appended claims, the latter foil alloys may be referred to generically as "high strength" foil and may be uncoated to facilitate joining by spot welding, for example.

According to the present invention a method is provided for making a honeycomb structure for use as a catalytic converter structure or catalyst carrier body, comprising the steps of assembling a plurality of non-nestable foil leaves, each foil leaf having opposite proximal and distal ends defining a leaf length, by interconnecting the proximal ends of the foil leaves to provide a continuous flexible strip of overlapping foil leaves in which the distal ends of the leaves extend freely; and subsequently forming the strip of foil leaves, arranging the leaves to lie in curved paths radiating inwardly from the interconnected proximal ends toward a central area.

Although the following preferred embodiment discloses a resulting body that can be inserted into a cylindrical jacket, bodies of other shapes, such as elliptical shapes, may also be constructed according to the teachings of the invention.

Figure 1B:
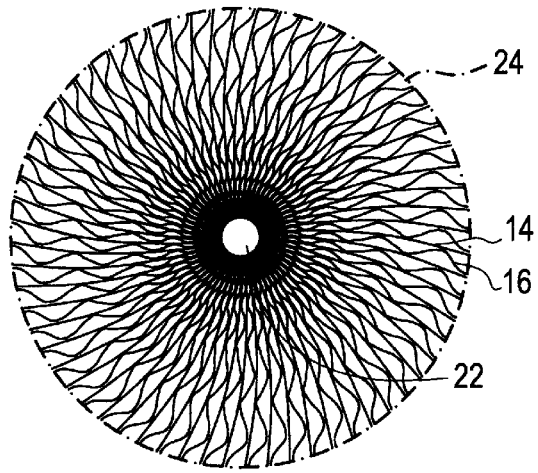
FIG. 1B is an enlarged cross-sectional view of the center portion of FIG. 1A.
Figure 1D:
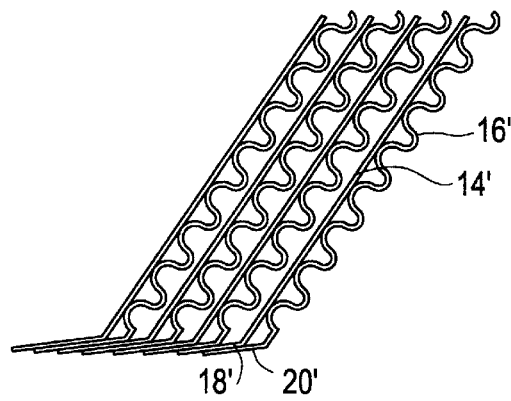
FIG. 1D is a partial cross-sectional view of an alternative construction of the arrangement shown in FIG. 1C.
Figure 1C:
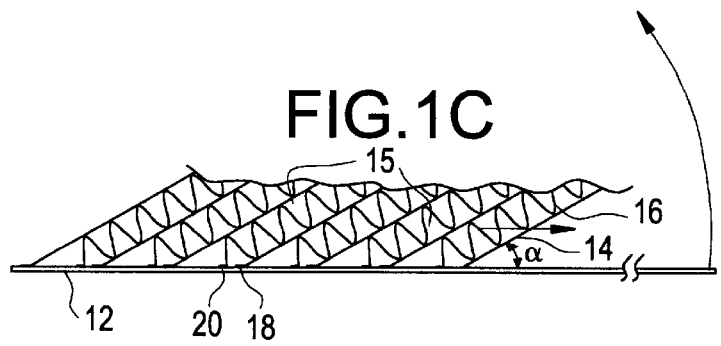
FIG. 1C is a partial cross-sectional view of a subassembly prior to being formed in the arrangement shown in FIG. 1A.

As shown in FIG. 1C, the plurality of foil leaves include an alternating series of sheets, namely corrugated foil leaves 16 and relatively flat leaves 14, that do not nest with one another and thereby define flow passages 15 between them when they are proximate to each other. A flat core element 12 may ultimately become the outer housing of the assembled catalytic converter or may be layered with a separate outer housing 13 as shown in FIG. 1A. The flat strip 12 preferably has a length equal to the inner circumference of the housing 13 and a desired thickness. Possible dimensions can be 8" for the circumferences and 0.03" for the thickness of the housing.

Therefore, it can be seen that instead of attaching the individual leaves to housing 13, which is typically 0.03" thick and relatively difficult to bend, the individual leaves preferably are first attached to a much thinner web of material such as a flattened strip of brazing foil tape, or a fabric strip, or other tape, which is easier to conform into a circular shape, and can serve as a liner for the outer housing 13. Such a web merely needs to keep the leaves together until they are formed into the final shape.

While in the flat condition shown in FIG. 1C, alternating flat thin metal core elements or foil leaves or sheets 14 and corrugated thin metal core elements or foil leaves or sheets 16 are secured to a flexible strip 12 which is relatively flat at the time of assembly. Each of the leaves may be about 5" in length and have proximal ends 18 and 20, of the flat and corrugated core elements 14 and 16, respectively, which are bent at an angle or to the normal plane of the core elements, preferably about 30 to 45 degrees. If previously coated, the ends 18 and 20 are cleaned, by scraping, brushing or blasting, or otherwise rendered free of any coating on the end to enable attachment to the flat strip 12 by brazing or welding. Alternatively, the ends may be masked during the coating process. The leaves may also be attached by riveting or other connection processes.

The leaves are then preferably curled to make each leaf into a more curled shape to make it easier to form the leaves into a final structure. For example, each leaf can be curled around a pencil or narrow-diameter rod.

Strip 12 then is bent into a circle by wrapping it on itself and formed so that the leaves lie in curved paths radiating inwardly from the interconnected proximal ends toward a central area 22, shown in FIG. 1A, and in greater detail in FIG. 1B. The ends of the strip 12 butt welded to become the jacket tube or housing 13. The distal ends 17 and 19 of the thin metal core elements 14 and 16 preferably are originally unattached to any other member and may continue to be unattached or may be selectively attached according to the application. In various applications, the foil leaves preferably lie in curved paths revolving through less than 360°, 270°, and 180°.

Instead of bending the strip 12 into a circle, the strip 12 with the thin metal strips attached may be inserted into a funnel shaped form and compressed by forcing them into the narrow opening of the desired diameter. The confronting ends of the strip 12 are then seam or butt welded to complete the core body 10.

As shown in FIG. 1D, the proximal ends 18' and 20' of the flat and corrugated thin metal core elements 14' and 16' alternatively may be made long enough to underlie the proximal end of the next thin metal core element, and the proximal ends thus overlapped may be brazed to one another to form the interconnected proximal ends. The resulting quite flexible assembly may be inserted into a jacket tube 13 lined with brazing foil or brazing paste and this assembly inductively heated to fuse the brazing foil and secure the strips to the jacket tube or housing 13.

Thus, the leaves may be interconnected by attaching the individual leaves to a separate web, strip or filament through a webbing technique shown in FIG. 1C or by connecting them directly to each other through a shingling technique shown in FIG. 1D.

To perform the preferred brazing operation, the subassembly preferably is put in a chamber. The air is evacuated and preferably backfilled with argon. A vacuum can be used as well so long as the oxygen is removed. Also in that chamber is an induction coil which goes around the housing with about eighth to a quarter inch clearance between the coil and the housing. When the induction coil is energized, it heats the housing and the outermost tips of the foil with induction with a very localized heating effect, melting the braze at the outside diameter. The outside portion of the cantilever strips do not have the coating on them so they braze nicely at the outside diameter.

FIGS. 2–11 show in greater detail alternative methods for assembling and forming the catalytic converter structure. In FIG. 2, the leaves 28 and 30 are shown to be interconnected at their outer ends 34 by welding overlapping end portions from which coating material has been removed or left uncoated by masking during the foil coating process. When the leaves are so assembled, they represent a subassembly 24a in the form of a continuous interconnected strip of the alternating corrugated and flat leaves 28 and 30. The inner ends 36 of the leaves 28 and 30 extend freely in the strip.

One technique for shaping the strip subassembly 24a of leaves into the annular involute configuration shown in FIG. 1A, for example, may involve use of a curved forming jig such as fixture 38 having a curved end 40 which preferably approximates the involute path of the individual leaves 28 and 30 in the finished annular section 24. The fixture 38 preferably has a curved length of about one half the distance around the core so that when the subassembly is pushed into the fixture, the fixture generates a half-round body.

Thus, a leading end 39 of the flexible strip subassembly 24a is advanced longitudinally, in the direction of the leaf length, along the fixture 38 in the direction shown in FIG. 3 until the ends of the leading leaves in the subassembly 24a engage and deform as a result of contact with the arcuate end or curved end portion 40. The loose cantilevered ends move to the center, leaving the connected ends at an outer circumference.

When it is no longer possible to advance the subassembly 24a toward the curve portion 40, a trailing end 41 of the flexible strip subassembly 24a is curved around the arcuate end portion of 40 the fixture 38, as shown in FIG. 5. The trailing end of the web is brought around and may be connected to the leading end of the web to complete the core. This configuration is maintained during insertion of the subassembly 24a into a slightly convergent funnel device so that the outer periphery of the assembly 24a may be inserted directly into the outer jacket.

Once in the jacket, the interconnected outer ends 34 of the annular section 24 are secured to the jacket such as by a localized brazing technique described above and capable of imparting brazing temperatures to the outer jacket without damage to the catalytic coating on the leaves 28 and 30.

In FIGS. 6–11 of the drawings, an alternative method for wrapping the subassembly 24a of leaves 28 and 30 into an annular configuration is illustrated. Thus, in FIG. 6, the subassembly 24a of leaves is first placed in a tray-like structure 42 from which the subassembly is advanced into an involute funnel-shaped fixture 44 shown in FIG. 7. The funnel may be one to three feet long and have guide vanes running through to assist in the progress and closing of the subassembly. The cross-section of the fixture 44 shown in FIG. 7 varies along cutting planes represented respectively in FIGS. 8, 9, 10, and 11 of the drawings.

Thus, the subassembly 24a is advanced through the fixture 44 to be formed progressively into the annular configuration shown in FIG. 11 in which the inner ends of the leaves 28 and 30 define a generally circular central opening 46. When the configuration of FIG. 11 is reached, the subassembly 24a is advanced into the cylindrical outer jacket and brazed at the outer ends of the leaves in the manner previously described.

Figure 12:
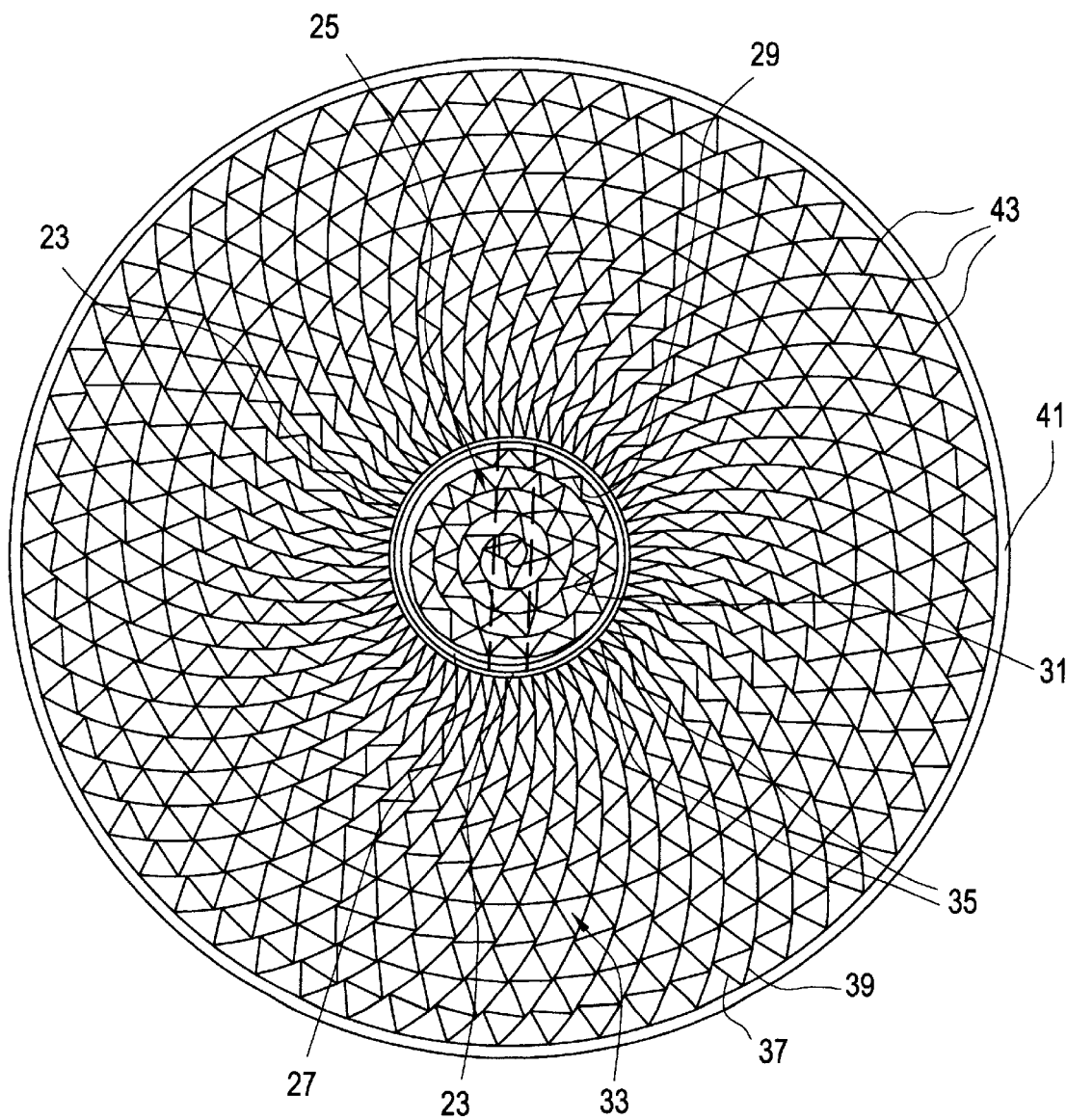
FIG. 12 is a catalytic converter formed according to the teachings of the present invention.

As shown in FIG. 12, after the steps of assembling the foil leaves into a continuous flexible strip and subsequently forming the leaves into curved paths, the distal ends may be connected to other distal ends and/or a tube 23, which in turn can be connected to a core 25. In this case, core 25 includes another tube 27 and a spiral of alternating corrugated leaves 29 and flat leaves 31. Such an arrangement provides a honeycomb 33 of the foil assembly in which the leaves lie in curved paths revolving through less than about 180°, and the distal ends 35 of corrugated foils 37 and flat foils 39 are connected to a core 25 having a plurality of cells. In this arrangement, the leaves rotate through about 25° between the core 25 and the jacket 41 where proximal ends 43 are attached.

The claimed catalytic converter structures and methods of making the structure can be used either as a complete catalytic converter structure or as a subcomponent or subassembly of a catalytic converter structure. For example, core 25 of the embodiment shown in FIG. 12 may be constructed according to the claimed invention so that the structure shown in FIG. 1 can be used as an alternative structure for the core 25 of the catalytic converter shown in FIG. 12.

It will be apparent to those skilled in the art that various modifications and variations can be made in the methods of forming a catalytic converter core according to the present invention and in the construction of this catalytic converter core without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A foil assembly for use in the manufacture of catalytic converter cores, consisting of
a plurality of non-nestable foil leaves having a leaf length, each foil leaf having opposite proximal and distal ends defining the leaf length, the distal ends of the leaves being unattached to another foil leaf of the foil assembly, the proximal ends of the foil leaves overlapping and being joined to each other to provide a continuous flexible strip of overlapping foil leaves lying in adjacent curved paths and radiating in a direction away from the joined proximal ends.

\* \* \* \* \*